United States Patent [19]

Lazik

[11] Patent Number: 5,430,865
[45] Date of Patent: Jul. 4, 1995

[54] HARDWARE REMOTE RESET CIRCUIT

[75] Inventor: George L. Lazik, Woodland Hills, Calif.

[73] Assignee: Astro Sciences Corporation, Chatsworth, Calif.

[21] Appl. No.: 959,339

[22] Filed: Oct. 13, 1992

[51] Int. Cl.$^6$ .............................. G06F 11/00
[52] U.S. Cl. ........................ 395/575; 371/62; 379/93; 379/102; 364/260.8; 364/DIG. 1
[58] Field of Search ................. 371/16.3, 66, 57.1, 371/62; 364/264.2, 260.8; 340/825.06; 379/93, 102; 375/16; 395/575

[56] References Cited

U.S. PATENT DOCUMENTS

| | | |
|---|---|---|
| 4,215,243 | 7/1980 | Maxwell . |
| 4,385,392 | 5/1983 | Angell et al. . |
| 4,481,574 | 11/1984 | Defino et al. . |
| 4,586,179 | 4/1986 | Sirazi et al. ............... 371/16.3 |
| 4,686,526 | 8/1987 | Gritzo ...................... 340/825.06 |
| 4,803,682 | 2/1989 | Hara et al. ................. 371/16.3 |
| 4,809,280 | 2/1989 | Shonaka ....................... 371/62 |
| 4,819,235 | 4/1989 | Kelly et al. . |
| 4,878,196 | 10/1989 | Rose . |
| 5,081,625 | 1/1992 | Rhee et al. ................. 371/16.3 |
| 5,123,018 | 6/1992 | Peterson .................... 371/16.3 |
| 5,155,846 | 10/1992 | Mino et al. ................. 395/575 |
| 5,202,884 | 4/1993 | Close et al. ................ 370/94.1 |

FOREIGN PATENT DOCUMENTS

| | | | |
|---|---|---|---|
| 194647 | 10/1985 | Japan | H04L 13/00 |
| 2100550 | 4/1990 | Japan | H04L 29/14 |
| 0348358 | 3/1991 | Japan . | |
| 7181852 | 6/1992 | Japan . | |

OTHER PUBLICATIONS

"AutoBoot Commander" CYBEX PC World Aug. 1994 p. 280.

Primary Examiner—Robert W. Beausoliel, Jr.
Assistant Examiner—Albert Decady
Attorney, Agent, or Firm—Brown, Martin, Haller & McClain

[57] ABSTRACT

A circuit for resetting a computer upon detection of changes in the signals of an RS-232C communications port in the computer. The changes may indicate an incoming phone call or loss of a previously established communication link. The circuit may monitor the RING INDICATE (RI) signal of the RS-232C port to detect the former condition and either the DATA CARRIER DETECT (DCD) signal or the DATA SET READY (DSR) signal of the RS-232C port to detect the latter condition. A timer prevents spurious changes in the monitored signal from causing the computer to reset.

22 Claims, 1 Drawing Sheet

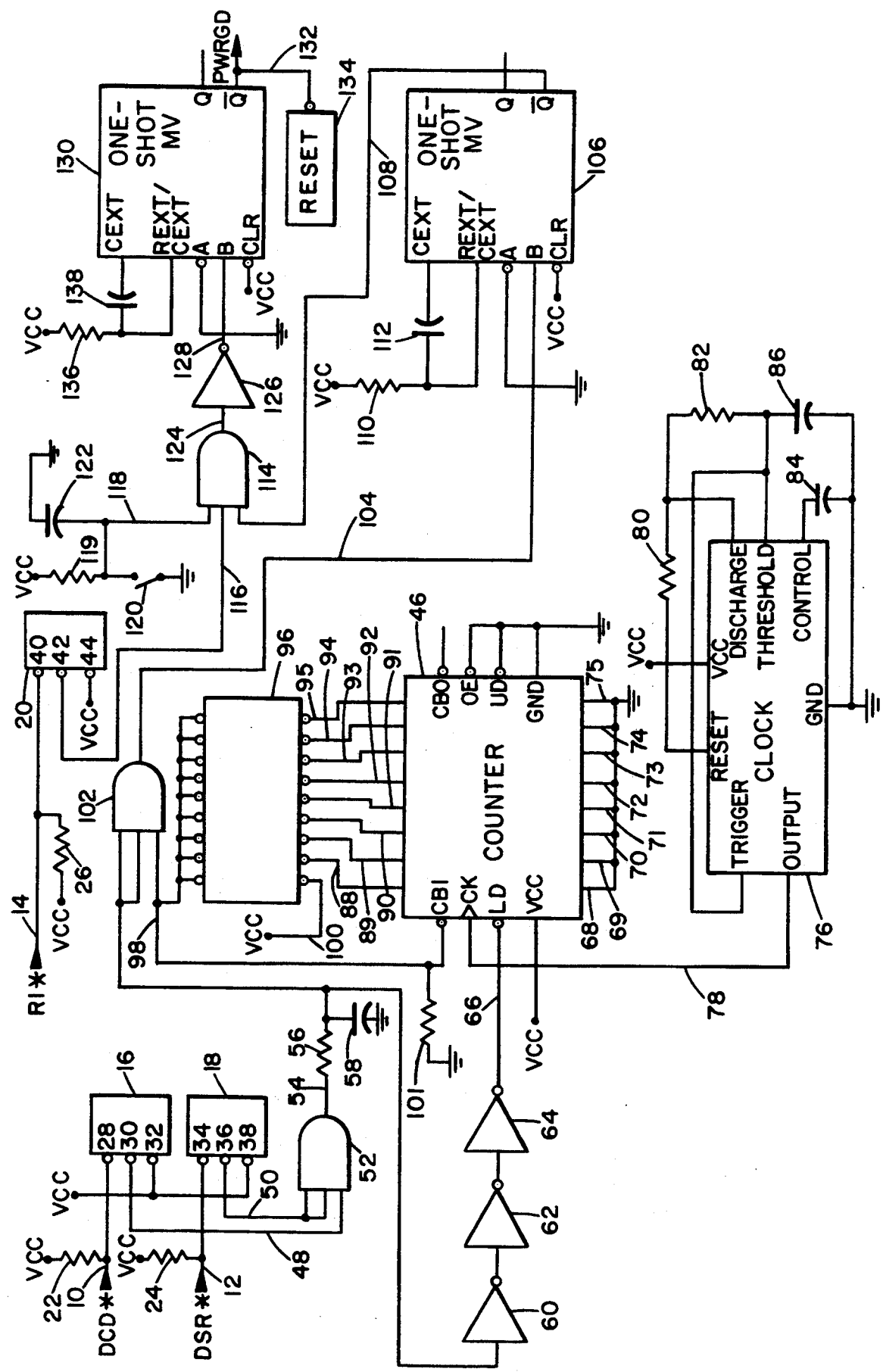

HARDWARE REMOTE RESET CIRCUIT

BACKGROUND OF THE INVENTION

The present invention relates to a circuit for resetting a computer in response to the state of communication signals received through a modem.

Computers may be reset either by software that monitors the keyboard or other input device for a predetermined input, or by physically actuating a reset switch that asserts the RESET line of the microprocessor. The former is commonly known as a "soft reset" and the latter is commonly known as a "hard reset." As a result of certain error conditions, the computer may enter undesirable states from which it cannot fully recover by executing a soft reset. Once the computer has entered such a state, only a hard reset will return the computer to its normal operating state.

A host computer may communicate with a remote computer over the telephone lines via a modem. A host computer may also communicate with a remote computer or other data communications equipment via direct cabling. In either of these configurations, the communications port of the host computer must be connected to the modem or data communications equipment. The RS-232C standard, promulgated by the Electronics Industries Association (EIA), is commonly used for communications through such a port. The RS-232C standard comprises several signals, including DATA CARRIER DETECT (DCD), DATA SET READY (DSR), and RING INDICATE (RI). A modem or other data communications equipment commonly asserts DSR when it is ready to establish communications and asserts DCD when reliable communications have been established. A modem asserts RI when a ring signal is present on the telephone line to which it is connected.

A host computer that is communicating through its communications port may enter undesirable error states when communications are unexpectedly terminated. Errors in the remote computer, faulty hardware, and problems on the telephone lines may all result in termination of communications. Termination of communications may be detected by the loss of either the DSR or DCD signal. It would be desirable to cause the computer to execute a hard reset in response to these conditions to enable the computer to resume normal communications. It would also be desirable to cause the computer to execute a hard reset upon the occurrence of other events, such as incoming telephone calls. These problems and deficiencies are clearly felt in the art and are solved by the present invention in the manner described below.

SUMMARY OF THE INVENTION

The present invention is a circuit that resets a computer when it detects changes in the signals of a communications port in the computer. The output of the circuit is connected directly to the RESET line of the computer. When the communications port is connected to a modem or other data communications equipment (DCE), the changes may indicate that a previously established communication link with the device has been lost. The changes may also indicate the presence of an incoming telephone call when the DCE is a modem.

The circuit monitors the RING INDICATE (RI) signal of the communications port to detect an incoming phone call and may monitor either the DATA CARRIER DETECT (DCD) signal or the DATA SET READY (DSR) signal of the communications port to detect that a communication link has been lost. When the circuit monitors one of the latter two signals, it first detects when the monitored signal enters its active state and then generates a reset signal when the monitored signal again enters the inactive state, which indicates that communications have been terminated.

A counter or other suitable timing means may inhibit generation of the reset signal if the monitored signal enters its inactive state within a predetermined time period after initially entering its active state. Thus, the circuit may reset the computer if, for example, the DCD signal enters its active state, then remains in its active state for more than the predetermined time period, then re-enters its inactive state. The time period may be selected using jumpers or other suitable selection means. The timing circuit prevents the circuit from resetting the computer in response to spurious changes in the monitored signal.

The foregoing, together with other features and advantages of the present invention, will become more apparent when referring to the following specification, claims, and accompanying drawings.

BRIEF DESCRIPTION OF THE DRAWINGS

For a more complete understanding of our invention, the following detailed description of the embodiment illustrated in the accompanying drawing is referred to, wherein the FIGURE is a schematic circuit diagram.

DESCRIPTION OF THE PREFERRED EMBODIMENT

The circuit resets a computer (not shown) upon detecting one or more of the following conditions on a RS-232C bus: the change of the DATA CARRIER DETECT (DCD) signal (not shown) from an active state to an inactive state; the change of the DATA SET READY (DSR) signal (not shown) from an active state to an inactive state; or the change of the RING INDICATE (RI) signal (not shown) from an inactive state to an active state. The illustrated embodiment of the present invention receives all signals at TTL voltage levels. Line receiver chips (not shown) may receive the DCD, DSR, and RI signals at the communications port, convert them from RS-232C voltage levels to TTL voltage levels, and provide their logical complements: a DCD* signal 10, a DSR* signal 12, and a RI* signal 14, respectively. The asterisk suffix designates a signal that is active-low, i.e., it is in the active state when it has a logical "0" value.

DCD* signal 10 and DSR* signal 12 are connected to jumper blocks 16 and 18, respectively, and the signal RI* is connected to a jumper block 20. DCD* signal 10, DSR* signal 12, and RI* signal 14 may be terminated with termination resistors 22, 24 and 26, respectively. Jumpers (not shown) may be inserted in jumper blocks 16, 18, and 20 to prevent changes in one or more of these signals from causing the computer to reset. Thus, the circuit responds to changes in DCD* signal 10 if a jumper is inserted between terminal 28 and terminal 30 of jumper block 16 and does not respond to changes in DCD* signal 10 if a jumper is inserted between terminal 28 and terminal 32. Similarly, the circuit responds to changes in DSR* signal 12 if a jumper is inserted between terminal 34 and terminal 36 of jumper block 18 and does not respond to changes in DSR* signal 12 if a jumper is inserted between terminal 34 and terminal 38. Similarly, the circuit resets the computer when RI* signal 14 enters the active state if a jumper is inserted between terminal 40 and terminal 42 of jumper block 20 and does not reset the computer regardless of the state of RI* signal 14 if a jumper is inserted between terminal 40 and terminal 44.

A counter 46 prevents the computer from resetting after DCD* signal 12 or DSR* signal 14 has changed from the active state to the inactive state if the signal that has changed had not been in the active state for at least a predetermined time period prior to entering the inactive state. Counter 46 may be of the "LS469" type.

Terminals 30 and 36 of jumper blocks 16 and 18 provide signals 48 and 50, respectively, to logical AND gate 52. Logical AND gate 52 provides trigger signal 54, which may be filtered with a resistor 56 and a capacitor 58 to remove switching transients. Trigger signal 54 is delayed through three invertors 60, 62 and 64. When trigger signal 54 is high, counter 46 cannot count because counter load signal 66 is low. Counter 46 is also loaded with a value of zero when load signal 66 is low because counter preload signals 68-75 are all low. A timer chip 76 provides a clock signal 78 to counter 46. Timer chip 76 may be of the "LM555" type. The cycle of clock signal 78 is determined by selecting values for resistors 80 and 82 and capacitors 84 and 86 as is known in the art.

The counter output signals 88-95 are connected to a jumper block 96 and provide a binary representation of the counter value. A jumper (not shown) may be inserted in jumper block 96 to connect one of counter output signals 88-95 to the counter enable signal 98. If a jumper is used to connect count enable signal 98 to Vcc signal 100 (logic high), the computer resets immediately after DCD* signal 10 or DSR* signal 12 enters the inactive state, i.e., the time period is zero. However, if a jumper is used to connect one of counter output signals 88-95 to counter enable signal 98, counter 46 stops counting when it has reached a value whereby the one of counter output signals 88-95 having the jumper is high. A pulldown resistor 101 maintains count enable signal 98 low when no jumpers are connected to prevent counter 46 from entering an unstable state.

Logical AND gate 102 receives trigger signal 54 and count enable signal 98 and provides a gated trigger signal 104 to a one-shot multivibrator 106, which may be of the "HC221" type. When gated trigger signal 104 changes from low to high, multivibrator 106 provides an active-low pulse signal 108. The width of pulse signal 108 is determined by selecting values for resistor 110 and capacitor 112, as known in the art. A logical AND gate 114 receives pulse signal 108 as well as a ring trigger signal 116, which is low when RI* is low if a jumper is connected between terminals 40 and 42 of jumper block 20. Logical AND gate 114 also receives a manual reset signal 118, which is normally high because it is connected to Vcc through a pullup resistor 119, but goes low when a switch 120 is manually closed. A capacitor 122 may be used to filter switching transients from manual reset signal 118.

Logical AND gate 114 provides an active-low second trigger signal 124, which is low when any of signals 118, 116, or 108 is low. Invertor 126 receives signal 124 and provides an active-high second trigger signal 128 to one-shot multivibrator 130, which may be of the "HC221" type. When signal 128 changes from low to high, multivibrator 130 provides an active-low reset signal 132, to the RESET* line 134 of the computer, thereby resetting it. The width of reset signal 132 is determined by selecting values for resistor 136 and capacitor 138, as known in the art.

In operation, the computer may be reset by an incoming phone call by inserting a jumper (not shown) between pins 40 and 42 of jumper block 20. When the phone rings, RI signal 14 enters the low state. Signal 124 goes low because signal 116 goes low. The rising edge of signal 128 triggers multivibrator 130, which provides an active low pulse to RESET* line 134 of the computer.

The computer may also be reset when the selected signal, which may be either DCD* signal 10 or DSR* signal 12, enters the inactive state after having been in the active state for a selected time period. DCD* signal 10 may be selected by inserting a first jumper between terminal 28 and terminal 30 of jumper block 16 and inserting a second jumper between terminal 34 and terminal 38 of jumper block 18. Alternatively, DSR* signal 12 may be selected by inserting a first jumper between terminal 28 and terminal 32 of jumper block 16 and inserting a second jumper between terminal 34 and terminal 36 of jumper block 18. The time period may be selected by inserting one jumper across jumper block 96. Because counter 46 is eight bits wide, a time period equal to 1, 2, 4, 8, 16, 32, 64, or 128 cycles of clock signal 78 may be selected.

When the selected signal enters the active state, counter 46 begins counting upwards from zero. If the selected signal changes from the active state to the inactive state before counter 46 has reached a count corresponding to the selected time period, then counter 46 immediately resets to zero and the circuit does not reset the computer. However, if the selected signal remains in the active state after counter 46 has reached a count corresponding to the selected time period, signal 98 goes high and counter 46 stops counting. Counter 46 does not reset to zero but remains in this state until the selected signal enters the inactive state. At that time, the circuit resets the computer because both signals 98 and 54 will be high simultaneously. Counter 46 resets to zero shortly after signal 54 goes high because invertors 60, 62, and 64 provide a small delay.

Obviously, other embodiments and modifications of the present invention will occur readily to those of ordinary skill in the art in view of these teachings. Therefore, this invention is to be limited only by the following claims, which include all such other embodiments and modifications when viewed in conjunction with the above specification and accompanying drawings.

I claim:
1. A circuit for resetting a computer having a reset line and a communications port for receiving communications signals, said communications signals comprising control signals and data signals, each control signal having an active state and an inactive state, said circuit comprising:
   detection means for detecting a change in at least one of said control signals between said active state and said inactive state and for providing a trigger signal solely in response to at least one said detected change; and
   pulse means for providing a reset pulse to said reset line in response to said trigger signal.

2. The circuit described in claim 1, wherein said detection means provides said trigger signal in response to a change from said inactive state to said active state.

3. The circuit described in claim 2, wherein one said control signal is a ring signal for indicating the presence of an incoming telephone call.

4. The circuit described in claim 3, further comprising selection means for selectively preventing said detection means from detecting a change in at least one of said control signals.

5. The circuit described in claim 4, wherein said selection means comprises at least at least one jumper.

6. The circuit described in claim 1, wherein said detection means provides said trigger signal in response to a first change from said inactive state to said active state and second change from said active state to said inactive state following said first change.

7. The circuit described in claim 6, wherein said detection means comprises timing means for preventing said pulse means from receiving said trigger signal when second change occurs within a predetermined time period following said first change.

8. The circuit described in claim 7 wherein said timing means is a counter circuit.

9. The circuit described in claim 8, wherein said timing means comprises at least one jumper for selecting said predetermined time period.

10. The circuit described in claim 9, wherein said control signals comprise a DATA CARRIER DETECT (DCD) signal and a DATA SET READY (DSR) signal.

11. The circuit described in claim 10, further comprising selection means for selectively preventing said detection means from detecting a change in at least one of said control signals.

12. The circuit described in claim 11, wherein said selection means comprises at least at least one jumper.

13. A circuit for resetting a computer having a reset line and a communications port for receiving communications signals, said communications signals comprising control signals and data signals, each control signal having an active state and an inactive state, said circuit comprising:

first trigger means for detecting at least one said control signal and for providing a first trigger signal solely in response to a change in said detected control signal between said active state and said inactive state;

a counter connected to said detection means for counting in response to said first trigger signal, said counter entering a reset state in response to the absence of said first trigger signal, said counter providing a terminal count signal when said counter reaches a predetermined count;

a clock generator for providing a clock signal to said counter; and a pulse generator for providing a reset pulse to said reset line in response to said terminal count signal and absence of said first trigger signal.

14. The circuit described in claim 13 wherein said communications signals detected by said first trigger means comprise a DATA CARRIER DETECT (DCD) signal and a DATA SET READY (DSR) signal.

15. The circuit described in claim 14, further comprising at least one jumper for selecting either said DCD signal or said DSR signal.

16. The circuit described in claim 15, further comprising at least one jumper for selecting said predetermined count.

17. The circuit described in claim 16 wherein said first trigger means provides said first trigger signal when said selected signal is in said inactive state.

18. The circuit described in claim 17, further comprising:

second trigger means for detecting at least one said communications signal not detected by said first trigger means and for providing a second trigger signal; and said pulse generator providing said reset pulse to said reset line in response to said second trigger signal.

19. The circuit described in claim 18, wherein said communications signals detected by said second trigger means comprise a RING INDICATE (RI) signal.

20. The circuit described in claim 19, further comprising a switch connected to said second trigger means for providing said second trigger signal in response to manual actuation of said switch.

21. A method for resetting a computer having a reset line and a communications port for receiving communications signals, said communications signals comprising control signals and data signals, each control signal having an active state and an inactive state, said method comprising the steps of:

detecting a first change in at least one of said control signal between said active state and said inactive state; and detecting a second change of said control signal between said active state and said inactive state following said first change and providing a reset pulse to said reset line in response to said detected second change.

22. The method for resetting a computer described in claim 21, further comprising the steps of:

measuring the time elapsed between said first change and said second change of said control signal; and inhibiting said reset pulse if said time elapsed is less than a predetermined time.

* * * * *